United States Patent [19]

Juso et al.

[11] Patent Number: 5,790,511
[45] Date of Patent: Aug. 4, 1998

[54] DUST-PROOF STRUCTURE FOR OPTICAL PICKUP UNIT

[75] Inventors: Hiromi Juso, Gose; Makoto Iwasawa, Sakai; Hiroshi Koide, Yamato; Tetsuo Kanno, Ebina, all of Japan

[73] Assignees: Sharp Kabushiki Kaisha, Osaka; Ricoh Company, Ltd., Tokyo, both of Japan

[21] Appl. No.: 697,434

[22] Filed: Aug. 23, 1996

Related U.S. Application Data

[63] Continuation of Ser. No. 374,106, Jan. 18, 1995, abandoned.

[30] Foreign Application Priority Data

Jan. 19, 1994 [JP] Japan .................................. 6-003990

[51] Int. Cl.⁶ .................................................. G11B 33/14
[52] U.S. Cl. ........................... 369/244; 369/72; 360/97.02
[58] Field of Search ........................ 360/97.02; 369/75.1, 369/75.2, 77.2, 72, 244, 71

[56] References Cited

U.S. PATENT DOCUMENTS

| | | | |
|---|---|---|---|
| 4,583,213 | 4/1986 | Bracken et al. | 369/261 |
| 5,086,422 | 2/1992 | Hagiya et al. | 369/75.1 |
| 5,109,368 | 4/1992 | Ohta et al. | 369/44.14 |
| 5,200,945 | 4/1993 | Engler et al. | 369/97.02 |
| 5,301,178 | 4/1994 | Okabe et al. | 360/97.02 |
| 5,418,775 | 5/1995 | Okatani | 369/72 |
| 5,426,628 | 6/1995 | Ishii | 369/97.02 |

FOREIGN PATENT DOCUMENTS

| | | |
|---|---|---|
| 3-113734 | 5/1991 | Japan . |
| 5-144059 | 6/1993 | Japan . |

Primary Examiner—Craig A. Renner
Assistant Examiner—Brian E. Miller
Attorney, Agent, or Firm—Morrison & Foerster LLP

[57] ABSTRACT

An optical pickup unit is formed such that a portion on an upstream side of the air flow has a streamline shape or similar shape to the streamline shape so as to keep the air flow generated with high speed rotations of a disc-shaped recording medium away from a vicinity of an objective lens. According to this arrangement, dust contained in the air flow can be prevented from adhering to the surface of the objective lens. Moreover, the dust will not enter inside the optical pickup unit through a small clearance between a lens holder of the objective lens and a cover for the optical pickup unit.

9 Claims, 4 Drawing Sheets

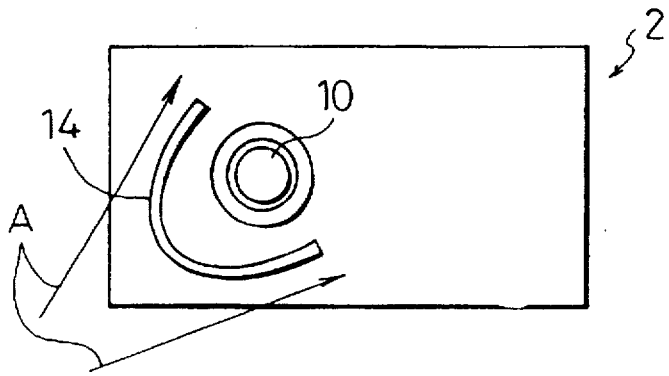
FIG.5(a)
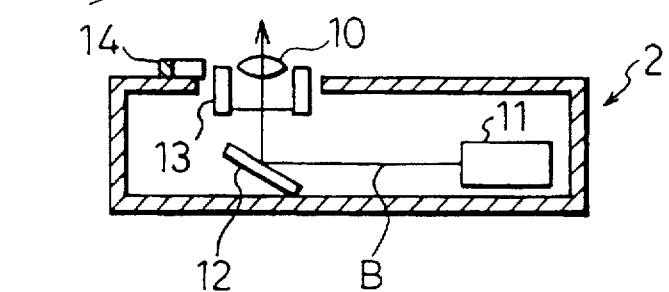
FIG.5(b)
FIG.6
(PRIOR ART)
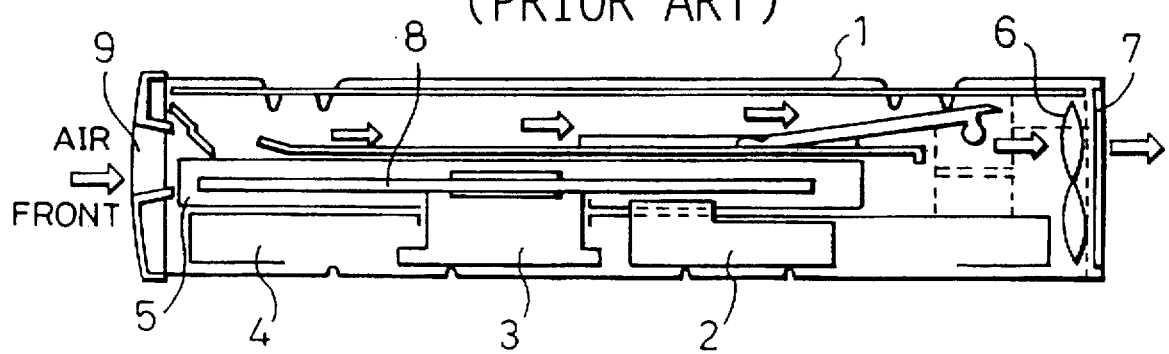

DUST-PROOF STRUCTURE FOR OPTICAL PICKUP UNIT

This application is a Continuation of application Ser. No. 08/374,106, filed Jan. 18, 1995, now abandoned.

FIELD OF THE INVENTION

The present invention relates to a dust-proof structure designed for an optical pickup unit provided in an optical recording and reproducing apparatus.

BACKGROUND OF THE INVENTION

Recently, disc-shaped recording media as well as optical recording and reproducing apparatuses adopting the media have been considered more and more important as means for recording and reproducing a large quantity of information such as image information, music information, data, etc. Many applications of the disc-shaped recording media are already on the market for various uses. Examples of such applications include: compact discs (CDs), laser discs (LDs), mini discs (MDs), CD-ROMs, CD-Rs, CD-Es, etc.

FIG. 6 shows one example of conventional optical recording and reproducing apparatuses. As shown in FIG. 6, a conventional optical recording and reproducing apparatus 1 is provided for recording and reproducing information on and from a disc-shaped recording medium 8. The apparatus 1 includes therein a spindle motor 3 for rotating the recording medium 8 at high speed and an optical pickup unit 2 for reading information from the recording medium 8 by projecting thereon a light beam. As shown in FIG. 7(b), the optical pickup unit 2 includes an optical system composed of a light source 11 such as a semiconductor laser for projecting a laser beam, a mirror 12, etc., an objective lens 10, a lens drive mechanism (not shown) for driving the objective lens 10, etc. In FIG. 7(b), an arrow B indicates an optical path of a laser beam projected from the light source 11.

The optical pickup unit 2 is provided with a lens holder 13 for supporting the objective lens 10, and the lens holder 13 is driven by the lens drive mechanism when focusing or tracking. In the described arrangement, a small clearance is formed between the lens holder 13 and a cover for the optical pickup unit 2 so that the lens holder 13 can be moved during the focusing or tracking operation without being disturbed. Therefore, it is important to have a dust-proof structure so that dust, especially fine dust, will not enter inside the optical pickup unit 2 through the small clearance.

As shown in FIG. 6, the conventional optical recording and reproducing apparatus 1 is also provided with a cooling fan 6. The cooling fan 6 prevents heat from an IC drive circuit (not shown) for driving the spindle motor 3, and heat generated from the recording medium 8 when thermal recording, and also from the spindle motor 3 being rotated at high speed, etc. The cooling fan 6 has not only the described function but also a dust-proof function. Namely, the cooling fan 6 forces dust entered inside the apparatus 1 through a disk cartridge opening 9 as being carried in the air flow (shown by the arrow in FIG. 6) as well as dust remaining inside the apparatus 1 to be sucked. The apparatus 1 is also provided with a dust collecting filter 7 for collecting the dust thus sucked so as to prevent the dust from entering inside the optical pickup unit 2. Alternatively, the apparatus 1 may be arranged so as to reinforce an accessibility between a base mechanism 4 and a disk cartridge 5 as another example of known dust-proof structures.

However, the inventors of the present invention noticed that even when the described dust-proof structures are adopted, in the active state of the optical recording and reproducing apparatus 1, dust entering inside the apparatus 1 as well as dust remaining inside the apparatus 1 adhere to and deposit on the optical pickup unit 2 as being carried in the air flow generated with the high-speed rotations of the recording medium 8.

An air flow velocity generated with high-speed rotations of the recording medium 8 may become extremely high. For example, in the case of a magneto-optical recording disc as the recording medium 8 with a disc diameter of 130 mm, an air flow velocity at the outermost circumference of the disc recording medium is 15 m/second at 3000 rotations/min, and in the case of a laser disc with a diameter of 300 mm, an air flow velocity is 27 m/second at 1800 rotations/min. In the described structure, since the optical pickup unit 2 is placed in a close vicinity to the recording medium 8, a velocity of an air flow blowing against the optical pickup unit 2 during the operation is assumed to be extremely high.

When air flow containing dust is blowing against the optical pickup unit 2 at high air flow velocity, the problem of dust adhering to and depositing on the objective lens 10 occurs. Moreover, since dust contained in the air flow also enters the inside of the optical pickup unit 2 through the small clearance between the lens holder 13, which is activated during the focusing or tracking operation, and the cover for the optical pickup unit 2, dust also adheres to and is deposited on the optical system in the optical pickup unit 2. Therefore, the problem is presented in that recording and reproducing performances of the optical recording and reproducing apparatus 1 may be lowered due to a reduction in quantity of the light beam or turbulence of the light beam projected from the optical pickup unit 2, or the apparatus 1 may stop operating.

SUMMARY OF THE INVENTION

An object of the present invention is to provide a structure for preventing an optical pickup unit from having dust adhere thereto and being deposited thereon as being carried in an air flow generated with high speed rotations of a disc-shaped recording medium.

In order to achieve the above-mentioned objective, the optical pickup unit in accordance with the present invention for recording and reproducing information on and from a disc-shaped recording medium by projecting a light beam onto the recording medium being rotated, is characterized by comprising:

(1) optical means for projected a light beam on the recording medium, the optical means being provided on a surface facing the recording medium; and (2) air-flow control means for controlling the direction of the air flow generated by rotations of the recording medium so as to keep the air flow away from the optical means.

According to the described arrangement, an air flow generated with rotations of the recording medium is controlled in its direction by the air-flow control means. Therefore, the air flow blowing directly against the optical means can be suppressed, thereby preventing the optical means from directly receiving the air flow. As a result, an effect of preventing dust contained in the air flow from adhering to and being deposited on the optical means can be achieved. Moreover, even when a small clearance is formed on the surface having formed thereon the optical means so as to surround the optical means, the dust will not enter inside the optical pickup unit through the small clearance.

As an example of the air-flow control means, a portion of the cover of the optical pickup unit may be formed on the upstream side of the air flow; in such a shape that the air flow blowing against the optical pickup unit is dispersed towards both sides of the optical pickup unit. According to this arrangement, since the air flow blowing directly against the optical means formed on the surface facing the recording medium can be suppressed, the aforementioned effects can be achieved also from this arrangement. Suitable shapes of the portion in cross section parallel to a plane of rotation of the recording medium include: a streamline shape, substantial semicircular shape, a triangular shape with a tip in the upstream side of the air flow, etc.

Alternatively, the present invention may be arranged such that the air-flow control means includes air-flow interrupting means for interrupting an air flow blowing against the optical means in the vicinity of the optical means, the air-flow interrupting means being provided on the upstream side of the air flow with respect to the optical means on a surface of the optical pickup unit facing the recording medium. According to this arrangement, the air flow blowing against the optical means is interrupted by the air-flow interrupting means, thereby effectively preventing the optical means from having dust adhere thereto and being deposited thereon.

The air-flow interrupting means may include a wall formed, for example, in a streamline shape so as to be convex in an upstream direction of the air flow in cross section parallel to a plane of rotation of the recording medium. In this arrangement, since the air flow blowing against the wall flows smoothly along the curved surface of the wall, a turbulence of the air flow is not likely to occur, thereby preventing dust from being blown up in the turbulence of air flow and adhering to the optical means.

The air-flow control means of the present invention may be arranged so as to further include air-flow adjusting means formed on the downstream side of the air flow with respect to the optical means, for inducing the air flow in a vicinity of the optical means towards the downstream side of the air flow with respect to the optical means. According to this arrangement, a turbulence of an air flow in a vicinity of the optical means can be surely prevented, thereby effectively preventing the optical means from having dust adhere thereto and being deposited thereon.

For a fuller understanding of the nature and advantages of the invention, reference should be made to the ensuring detailed description taken in conjunction with the accompanying drawings.

BRIEF DESCRIPTION OF THE DRAWINGS

FIG. 5(a) is a view showing another dust-proof structure designed for the optical pickup unit.

FIG. 5(b) is a cross-sectional view showing the optical pickup unit shown in FIG. 5(a).

FIG. 6 is a cross-sectional view showing a dust-proof structure designed for a conventional optical pickup unit.

DESCRIPTION OF THE EMBODIMENTS

The following descriptions will discuss one embodiment of the present invention with reference to FIG. 1 through FIG. 5.

Figure 1A:
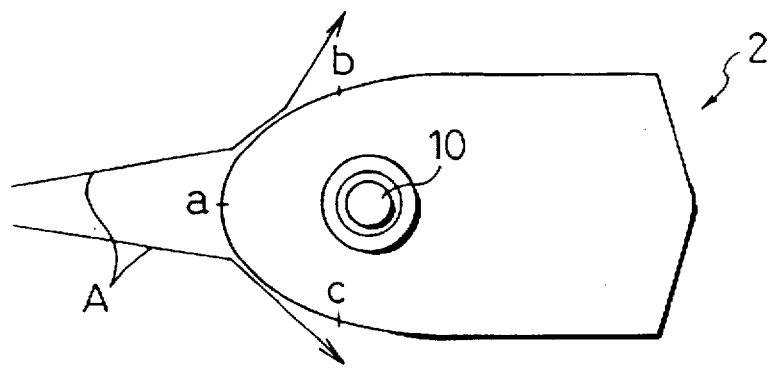
FIG. 1(a) is a view showing a dust-proof structure designed for an optical pickup unit and an air flow surrounding the optical pickup unit in accordance with one embodiment of the present invention.

FIGS. 1(a) and (b) are explanatory views showing a dust-proof structure designed for an optical pickup unit in accordance with the first embodiment of the present invention.

Figure 1B:
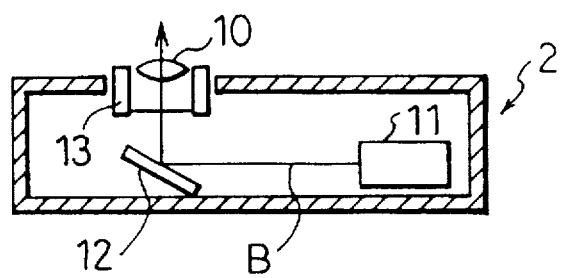
FIG. 1(b) is a cross-sectional view of the optical pickup unit shown in FIG. 1(a).

As shown in FIG. 1(b), an optical pickup unit 2 includes therein a light source 11 such as a semiconductor laser for projecting a laser beam, etc., and a mirror 12. A laser beam projected from the light source 11 is reflected from the mirror 12, and passes through the objective lens 10 provided on the upper surface of the optical pickup unit 2 so as to be incident on a recording medium (not shown) being rotated at high speed. Here, the recording medium is set so as to face the upper surface of the optical pickup unit 2. The optical pickup unit 2 is further provided with a lens holder 13 for supporting the objective lens 10. Lens holder 13 is activated by a lens drive mechanism (not shown) so as to perform a focusing operation, etc.

As shown in FIG. 1(a), the front portion of the optical pickup unit 2, which receives an air flow generated by the high-speed rotations of the recording medium is formed in a streamline shape or in a similar shape to the streamline shape. According to this arrangement, the air flow is smoothly dispersed towards both sides of the optical pickup unit 2 as shown by arrows A.

Therefore, the air flow containing dust can be kept away from the vicinity of the objective lens 10, and thus the objective lens 10 can be protected from having dust adhering thereto and being deposited thereon. Moreover, the dust can be prevented from entering inside the optical pickup unit 2 through a small clearance between the lens holder 13 and the cover for the optical pickup unit 2. As described, the air flow can be smoothly dispersed towards both sides of the optical pickup unit 2, and a turbulence of the air flow is not likely to occur, thereby suppressing an inverse air flow containing dust towards the vicinity of the objective lens 10.

The explanations have been given in reference to FIG. 1(a) through the example of the optical pickup unit 2 wherein a line connecting the tip a and side points b and c forms a streamline shape. However, suitable shapes similar to the streamline shape when seen from above include a shape wherein a line connecting the tip a and the side points b and c forms a semicircle, a shape wherein respective line connecting the tip a and the side points b and c are two sides of a triangle. Any of the above-mentioned shapes enables the air flow to be kept away from the vicinity of the objective lens 10.

Figure 2A:
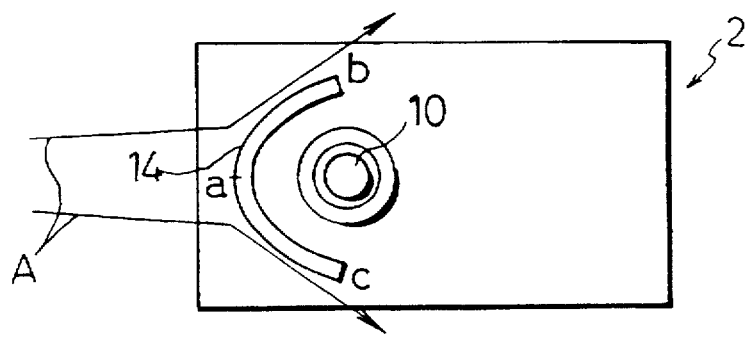
FIG. 2(a) is a view showing another dust-proof structure designed for the optical pickup unit.

FIGS. 2(a) and (b) are explanatory views showing another dust-proof structure designed for the optical pickup unit in accordance with the second embodiment.

Figure 2B:
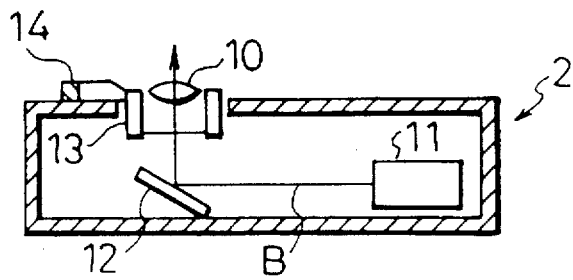
FIG. 2(b) is a cross-sectional view of the optical pickup unit shown in FIG. 2(a).

In the present embodiment, a wind-proof wall 14 (air-flow control means) is formed in a streamline shape or in a similar shape to the streamline shape in a vicinity of the objective lens 10 provided on the upper surface of the optical pickup unit 2 as shown in FIG. 2(a). Namely, the wind-proof wall 14 is formed on the air-flow receiving side of the objective lens 10. As shown in FIG. 2(b), the height of the wind-proof wall 14 is set slightly taller than the objective lens 10 but low enough to ensure the rotations of the recording medium (not shown) just above the upper portion of the wind-proof wall 14.

Therefore, a portion of the air flow generated by high-speed rotations of the disk-shaped recording medium, blowing against the upper surface of the optical pickup unit 2 and containing dust is dispersed along both sides of the wind-proof wall 14 as shown by arrows A in FIG. 2(a).

According to the described arrangement, since the air flow blowing directly towards a vicinity of the objective lens 10 can be suppressed, the objective lens 10, as well as the mirror 12 and the light source 11, etc., in the optical pickup unit 2 can be protected from having dust adhere thereto and being deposit thereon. Furthermore, dust can be prevented from entering the inside of the optical pickup unit 2 through the small clearance formed between the lens holder 13 and the cover for the optical pickup unit 2.

As shown in FIG. 2(a), the wind-proof wall 14 is streamline in shape when it is seen from above by connecting the tip a with side points b and c. However, the wind-proof wall 14 may be formed in similar shapes to the above-mentioned streamline shape. Such similar shapes include: a shape wherein the line connecting one side point b and the other side point c is bent outward in the upstream direction of an air flow so as to form a semicircular shape or a triangular shape so that a line connecting the tip a and the side point b and a line connecting the tip a and the side point c are two sides of the triangle with the tip a. Any of the shapes listed above permits a smoother air flow along the wind-proof wall 14. Therefore, the turbulence of an air flow is not likely to occur, and an inverse flow of dust can be prevented.

Other arrangements may be adopted as long as the objective lens 10 can be prevented from directly receiving an air flow. Examples of other arrangements include: an arrangement where a plate-like wall is formed on the air flow receiving side of the objective lens 10 in an orthogonal direction or slanted direction with respect to the air flow.

Figure 3A:
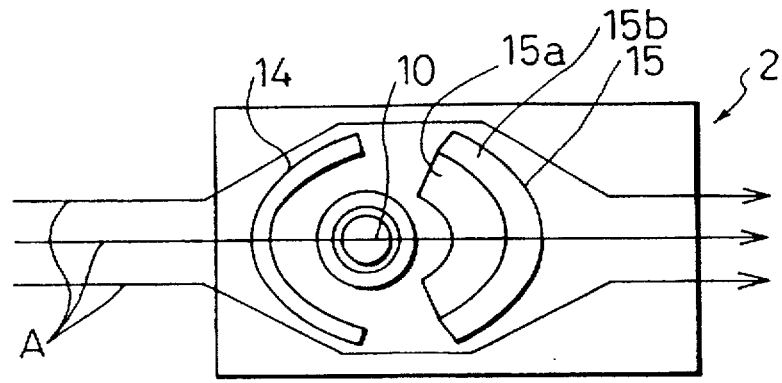
FIG. 3(a) is a view showing still another dust-proof structure designed for the optical pickup unit.

FIGS. 3(a) and (b) are explanatory views showing another dust-proof structure designed for the optical pickup unit in accordance with the third embodiment of the present invention.

In the present embodiment, a wind-proof wall 14 and an air-flow adjusting wall 15 are formed in the vicinity of the objective lens 10 provided on the upper surface of the optical pickup unit 2 as shown in FIG. 3(a). The wind-proof wall 14 is formed in a streamline shape or similar shape to the streamline shape and serves as the air-flow control means, while the air-flow adjusting wall 15 serves as the air-flow adjusting means. The wind-proof wall 14 is formed on the air-flow receiving side of the objective lens 10, and the air-flow adjusting wall 15 is formed on the side opposite to the side of the objective lens 10 where the wind-proof wall 14 is formed.

As shown in FIGS. 3(a) and (b), the air-flow adjusting wall 15 has an inclined face 15a inclining upward with a small inclination from the vicinity of the objective lens 10 in a direction away from the objective lens 10 and an inclined face 15b inclining downward with a small inclination from the highest position of the inclined face 15a in the direction away from the objective lens 10. Here, the inclination of the inclined face 15a is smaller than that of the inclined face 15b.

Figure 3B:
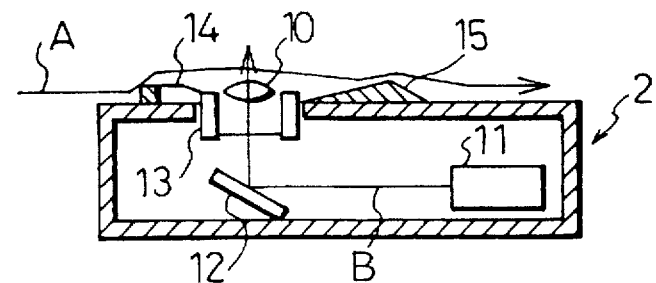
FIG. 3(b) is a cross-sectional view of the optical pickup unit shown in FIG. 3(a).

In the described arrangement, the direction of the air flow blowing against the optical pickup unit 2 is altered towards the sides and above the wind-proof wall 14 as shown in arrows A in FIG. 3(a). As shown in FIG. 3(b), the air flow blowing above the wind-proof wall 14 passes above the objective lens 10 and hits the inclined face 15a of the air-flow adjusting wall 15, and then joins the air flows on the downstream side of the air flow along the inclined face 15a.

If the air-flow adjusting wall 15 was not formed, a portion of the air flow whose direction has been altered by the wind-proof wall 14 would be a turbulent air as the air flows in whirls from the side and upper portions of the wind-proof wall 14 towards the back surface side of the wind-proof wall 14, thereby presenting the problem that dust contained in the turbulence of the air flow would blow against the objective lens 10. However, by forming the air-flow adjusting wall 15, the clearance formed between the recording medium (not shown) being rotated in a close vicinity to the upper surface of the optical pickup unit 2 and the inclined face 15a becomes gradually narrower in a downstream direction of the air flow, while the clearance between the recording medium and the inclined face 15b over the highest portion of the inclined face 15a becomes suddenly wide. By the difference in pressure due to the difference in width of the clearance, the air flow is sucked out in the direction from the inclined face 15a to the inclined face 15b.

In the described arrangement, since the occurrence of the turbulence of the air flow can be suppressed, the air flow can be made smoother as shown by arrows A in FIG. 3(a). Therefore, an inverse flow of air containing dust in the vicinity of the objective lens 10 can be prevented, thereby preventing the objective lens 10 from having dust adhere thereto and being deposited thereon. Moreover, the dust can be prevented from entering inside the optical pickup unit 2 through the small clearance between the lens holder 13 and the cover for the optical pickup unit 2.

Another dust-proof structure designed for the optical pickup unit in accordance with the fourth embodiment of the present invention will be explained below in reference to FIGS. 4(a) and (b) and FIGS. 5(a) and (b).

Figure 4A:
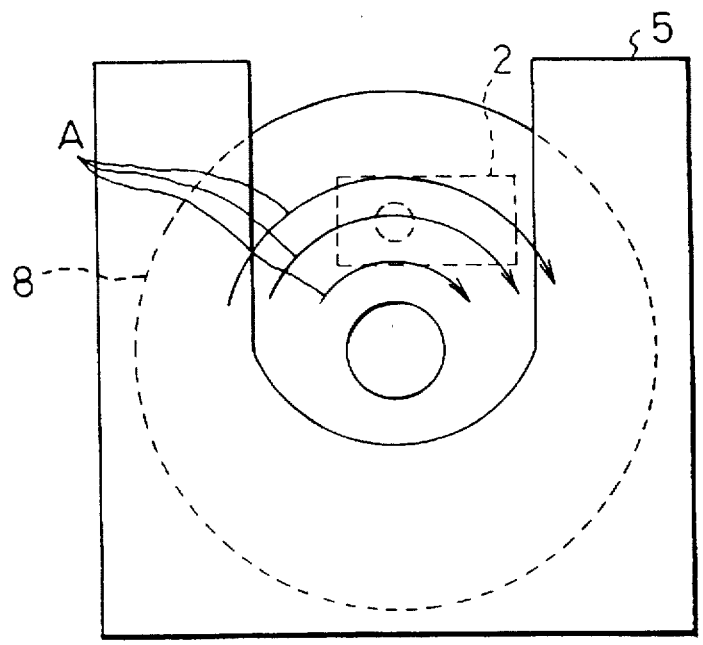
FIG. 4(a) is a view showing an air flow around an optical pickup unit.
Figure 4B:
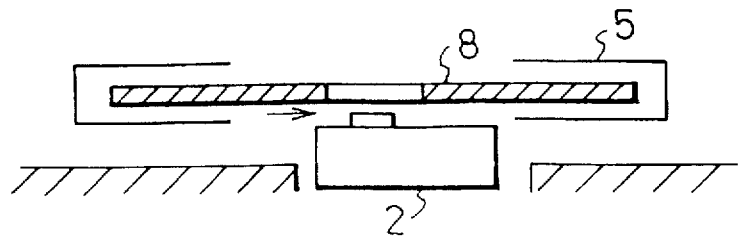
FIG. 4(b) is a cross-sectional view of the optical pickup unit shown in FIG. 4(a).
Figure 7A:
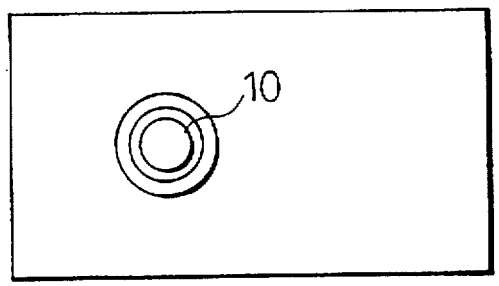
FIG. 7(a) is a view showing the structure of the conventional optical pickup unit shown in FIG. 6.
Figure 7B:
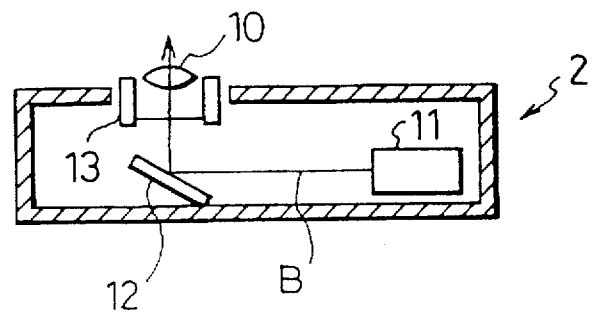
FIG. 7(b) is a cross-sectional view of the conventional pickup unit shown in FIG. 6.

FIGS. 4(a) and (b) are explanatory views showing the directions of an air flow generated with high-speed rotations of a disc-shaped recording medium 8 in a vicinity of the optical pickup unit 2. The air flow generated by the high-speed rotations of the disc-shaped recording medium 8 has a component in a tangent line of the rotating direction of the recording medium 8 as shown by arrows A in FIG. 4(a). The attentions of the inventors of the present invention had been directed to the above-mentioned fact, and the following arrangement was proposed: an arrangement where the wind-proof wall 14 is placed in an orthogonal direction to the tangent line component of the air flow.

In the described arrangement where the wind-proof wall 14 is formed in the orthogonal direction to the above-mentioned component of the air flow, the air flow containing dust can be effectively prevented from blowing towards the vicinity of the objective lens 10 provided on the upper surface of the optical pickup unit 2, thereby preventing the objective lens 10 as well as the optical system, etc., in the optical pickup unit 2 from having dust adhere thereto and being deposited thereon. Moreover, dust can be also prevented from entering inside the optical pickup unit 2 through the small clearance formed between the lens holder 13 and the cover for the optical pickup unit 2.

In the described preferred embodiments, the arrangement where the front face of the optical pickup unit, which receives the air flow, is formed, for example, in a streamline shape and the arrangement where the wind-proof wall is formed have been explained as separate examples. However, combinations of the described arrangements may be adopted. In the case of adopting such combinations, the synergetic effect can be achieved.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

what is claimed is:

1. An optical pickup unit for recording and reproducing information on and from a disc-shaped rotating recording medium by projecting thereon a light beam, comprising:

optical means for projecting a light beam onto the recording medium, said optical means facing the recording medium;

air-flow interrupting means for diverting an air flow directed against said optical means, which air-flow is generated by the rotating recording medium, said air-flow interrupting means being provided on an upstream side of the air flow with respect to said optical means; and air-flow adjusting means formed on a downstream side of the air flow with respect to said optical means, for inducing an air flow from a vicinity of said optical means in said downstream direction, said air-flow adjusting means being provided separately from said air-flow interrupting means, wherein said air-flow adjusting means includes a first inclined face formed on the upstream side of said air-flow adjusting means and a second inclined face formed on the downstream side of said air-flow adjusting means, said first inclined face being upwardly inclined towards the downstream side of the air-flow, and said second inclined face being downwardly inclined towards the downstream side of the air-flow, and wherein said first inclined face has a first inclination and said second inclined face has a second inclination, wherein said first inclination is smaller than said second inclination, so that the air-flow is sucked out in a direction from said first inclined face to said second inclined face because of the difference in pressure due to the difference in width of clearance between said disk and said first and second inclined faces respectively.

2. The optical pickup unit as set forth in claim 1, wherein:

said air-flow interrupting means includes a wall formed such a manner that a portion on the upstream side of the air flow is convex in cross-section parallel to a plane of rotation of the recording medium.

3. The optical pickup unit as set forth in claim 2, wherein:

said wall of said air-flow interrupting means is streamline in shape in cross section parallel to the plane of rotation of the recording medium.

4. The optical pickup unit as set forth in claim 2, wherein:

said wall of said air-flow interrupting means is semicircular in shape in cross section parallel to the plane of rotation of the recording medium.

5. The optical pickup unit as set forth in claim 2, wherein:

said wall of said air-flow interrupting means is plate-like and is placed in such a position that a wall surface thereof is substantially orthogonal to the air flow.

6. The optical pickup unit as set forth in claim 2, wherein:

said wall of said air-flow interrupting means is plate-like and is placed in such a position that a wall surface thereof is inclined with respect to the air flow.

7. The optical pickup unit as set forth in claim 2, wherein:

said air-flow interrupting means includes a pair of walls; and respective ends of surfaces of said pair of walls are in contact with one another on an upstream side of the air flow against said optical means and said optical means is placed within an interior angle formed with said pair of walls.

8. The optical pickup unit as set forth in claim 2, wherein:

said wall of said air-flow interrupting means is formed in such a position that a wall surface is substantially orthogonal to a concentric circle of the recording medium.

9. The optical pickup unit as set forth in claim 1, further comprising:

a housing enclosing said optical pickup unit is formed in such a manner that a portion on an upstream side of the air flow is convex-shaped to the air flow.

* * * * *